US009015761B2

(12) United States Patent
Wright et al.

(10) Patent No.: US 9,015,761 B2
(45) Date of Patent: Apr. 21, 2015

(54) SYSTEM FOR INTERACTING WITH AN ELECTRONIC PROGRAM GUIDE

(71) Applicants: Kevin Wright, London (GB); Kerry Jones, London (GB)

(72) Inventors: Kevin Wright, London (GB); Kerry Jones, London (GB)

(73) Assignee: Beamly Limited (GB)

( * ) Notice: Subject to any disclaimer, the term of this patent is extended or adjusted under 35 U.S.C. 154(b) by 0 days.

(21) Appl. No.: 13/774,793

(22) Filed: Feb. 22, 2013

(65) Prior Publication Data

US 2014/0245355 A1    Aug. 28, 2014

(51) Int. Cl.
H04N 5/445 (2011.01)
G06F 3/00 (2006.01)
G06F 13/00 (2006.01)
H04N 21/462 (2011.01)
H04N 21/482 (2011.01)
H04N 21/8405 (2011.01)
H04N 21/258 (2011.01)
H04N 21/431 (2011.01)
H04N 21/4788 (2011.01)
H04N 21/84 (2011.01)

(52) U.S. Cl.
CPC ....... H04N 21/4622 (2013.01); H04N 21/4826 (2013.01); H04N 21/8405 (2013.01); H04N 21/258 (2013.01); H04N 21/4312 (2013.01); H04N 21/4788 (2013.01); H04N 21/4821 (2013.01); H04N 21/84 (2013.01)

(58) Field of Classification Search
USPC ........................................ 725/40, 50, 51, 109
See application file for complete search history.

(56) References Cited

U.S. PATENT DOCUMENTS

| | | | |
|---|---|---|---|
| 7,478,414 B1 | 1/2009 | Glusker et al. | |
| 2002/0112239 A1 | 8/2002 | Goldman | |
| 2004/0231003 A1 | 11/2004 | Cooper et al. | |
| 2008/0208839 A1 | 8/2008 | Sheshagiri et al. | |
| 2009/0228921 A1 | 9/2009 | Miki et al. | |
| 2010/0031290 A1 | 2/2010 | Hua et al. | |
| 2010/0306805 A1 | 12/2010 | Neumeier et al. | |
| 2010/0319015 A1 | 12/2010 | Remington | |
| 2012/0124625 A1* | 5/2012 | Foote et al. | 725/42 |
| 2012/0174157 A1* | 7/2012 | Stinson et al. | 725/40 |
| 2012/0174162 A1* | 7/2012 | Roberts et al. | 725/52 |
| 2012/0192227 A1* | 7/2012 | Fleischman et al. | 725/34 |
| 2012/0222061 A1* | 8/2012 | Anthru et al. | 725/28 |
| 2012/0291070 A1* | 11/2012 | Feng et al. | 725/40 |

FOREIGN PATENT DOCUMENTS

| | | | |
|---|---|---|---|
| EP | 1318672 A1 | 6/2003 | |
| EP | 2251995 A1 | 11/2010 | |
| EP | 2276240 A2 | 1/2011 | |

(Continued)

*Primary Examiner* — Ricky Chin
(74) *Attorney, Agent, or Firm* — St. Onge Steward Johnston & Reens LLC

(57) ABSTRACT

A computer system includes a display that displays an electronic program guide to a user. A data storage unit includes keywords related to television shows currently being broadcast. A server device is configured to retrieve real-time data related to a person of interest from the internet by monitoring messages that they generate. The server device can then identify one or more matches between the retrieved data and the stored keywords, and can output a modified electronic program guide including an indication of matching keywords. This can allow an electronic program guide to include an inference of the television show that a person of interest is likely to be watching or talking about online.

8 Claims, 6 Drawing Sheets

(56) References Cited

FOREIGN PATENT DOCUMENTS

| | | |
|---|---|---|
| KR | 20110071450 A | 6/2011 |
| WO | 2008101557 A1 | 8/2008 |
| WO | 2010112072 A1 | 10/2010 |
| WO | 2011093649 A2 | 8/2011 |

\* cited by examiner

SYSTEM FOR INTERACTING WITH AN ELECTRONIC PROGRAM GUIDE

FIELD OF THE INVENTION

This invention relates to a computer system and a corresponding method for interacting with an Electronic Program Guide (EPG).

BACKGROUND OF THE INVENTION

EPGs are commonly used in digital television so that a user can review scheduled television programs. Typically an EPG can be displayed on a television screen, a computer screen or a remote control. An EPG often includes a list of scheduled television programs, typically ranked by the ordinal number of the channel or by genre.

With traditional broadcast television a number of viewers receive and view television programs and EPGs in their homes, entirely independently of one another. This model is somewhat out of step with developments in interconnected social networks where users can engage with their peers and/or celebrities using internet messaging sites. It would be desirable to provide an EPG that can allow viewers to connect and interact with their peers, celebrities or other persons of interest.

SUMMARY OF THE INVENTION

An object of the invention is to alleviate some of these problems in computer systems that use EPGs.

According to the present invention there is provided a computer system comprising: a data storage unit arranged to store data related to television shows being broadcast; and one or more processors configured to retrieve real-time data related to a person of interest, to identify one or more matches between the retrieved data and the stored data, and to output an electronic program guide including content related to a match identified by the one or more processors.

In this way, an EPG can be modified to indicate television shows that match real-time data generated by a person of interest such as a celebrity. In many embodiments matches are likely to be identified when the person of interest has made a comment on the television show, possibly using a personal blogging site such as Twitter®. By detecting these matches, it may be deduced in real-time that the person of interest is likely to be watching the television show. An EPG can be modified to include an indication of the person of interest; this may comprise a thumbnail image positioned adjacent the relevant television show. In this way, a user of the EPG may be able to appreciate which celebrities are watching television, and which shows they are viewing. This may be useful for the user in shaping their viewing schedule.

Preferably the real-time data includes comments generated by the person of interest on the internet. For example, the real-time data may include the person of interest's Twitter® feed and/or comments generated on a social networking platform such as Facebook®, LinkedIn® or Bebo®. Any comments from a personal blog may be used and the real-time data may also include electronic messages such as emails or text messages (where these are freely accessible). One or more of these sources may be combined in the real-time data.

In this way the real-time data can be analysed to determine whether it includes words that match key words related to television shows currently being broadcast, or due to be broadcast in the near future. By matching key words with the text in the real-time data it may be possible to infer that the person is watching a particular show or is, at least, discussing it online.

In one example a celebrity may refer to the title of a television show in their Twitter® account. This may be detected and used to infer that the celebrity is likely to be watching the show or talking about it online. The EPG can then be modified to include an indication of the celebrity alongside the relevant show. This information may be useful and interesting to users of the EPG.

The EPG preferably includes information relating to one or more television shows and an identifier for the person of interest, wherein the identifier is positioned in the EPG so that it corresponds to the television show for which a match has been determined. This can provide a simple visual mechanism for indicating which television content is being viewed by the person or persons of interest. In certain embodiments a thumbnail image of the person of interest may be embedded in the EPG adjacent or alongside the relevant television show.

The one or more processors may be configured to identify one or more matches between the words in the retrieved data and keywords in the stored data. The data storage unit is preferably arranged to store a list of keywords related to television shows being broadcast. The keywords may include terms that are pertinent to the content of the television show. For example, the keywords could include the title of the show as well as names of actors, themes or relevant place names.

The output EPG may include content related to the most recent match identified by the one or more processors. In one example a person of interest may generate real-time data including comments concerning a first television show, and then begin commenting on a second television show. This change in behaviour may be indicative of the person of interest changing channel. By including content related to the most recent match it is possible to ensure that the information in the EPG is up to date.

The output EPG may include content related to a match detected within a predetermined time period. Content may be included in the EPG only for contemporaneous data. Thus, if a match is made with old data then this is preferably not used in the EPG. The predetermined time period may be around one hour for television applications.

The one or more processors may be configured to retrieve real-time data related to a plurality of persons of interest, and the output EPG may include content related to a plurality of matches. It may be possible to monitor real-time data for a number of different individuals, and to include information about any matches in the EPG. Thus, a user can quickly see which of their favourite celebrities are watching television, and which show they are most likely to be viewing. The data may be acquired by subscribing to receive real-time blog updates from the group of celebrities.

The one or more processors may be configured to rank television shows in the EPG according to the number of persons of interest with matching real-time data. In this way a user can quickly see which television shows are most popular with a particular group of celebrities. The user may apply this information when deciding which television show to view. The celebrities included in the group may be determined by the user or a system administrator.

The data storage unit may be arranged to store data related to television shows scheduled to be broadcast at future times, and the one or more processors may be configured to identify one or more matches between the retrieved data and the stored data related to television shows scheduled to be broadcast at future times. In this way it may be possible to identify comments created by the one or more persons of interest that are relevant to up-coming shows. If the person of interest is commenting on this show then it may be possible to infer that they intend to watch it. The EPG can be modified to include an indication of the person of interest alongside the relevant show so that a user can align their viewing schedule if required.

In one arrangement the output EPG includes only content related to currently broadcast television show, even if matches have been identified for shows scheduled in the future. In this way the appearance of the EPG can be simplified. In addition, a user may be less likely to be confused by multiple indications of a person of interest against different shows.

In an alternative configuration it may be possible to display an indication of a person of interest against multiple shows scheduled at different times. In this way a user may be able to align their viewing schedule with that of a particular person of interest.

The computer system may include a display for showing the EPG and the content related to a match identified by the one or more processors. The display may be provided in a user device and a server computer may also be provided in communication with the user device.

The one or more processors may be provided in the server computer and/or in the first user device. The tasks performed in the computer system can therefore be distributed in any convenient manner.

According to another aspect of the invention there is provided a method of outputting an EPG comprising the steps of: retrieving real-time data related to a person of interest; identifying one or more matches between the retrieved data and stored data related to television shows being broadcast; and outputting an EPG including content related to an identified match.

According to yet another aspect of the invention there is provided a computer readable storage medium having a computer program stored thereon, the computer program comprising processor readable instructions that, when executed, direct a device to perform actions comprising: retrieving real-time data related to a person of interest; identifying one or more matches between the retrieved data and stored data related to television shows being broadcast; and outputting an EPG including content related to an identified match.

Apparatus features may be provided as corresponding method features and vice-versa.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
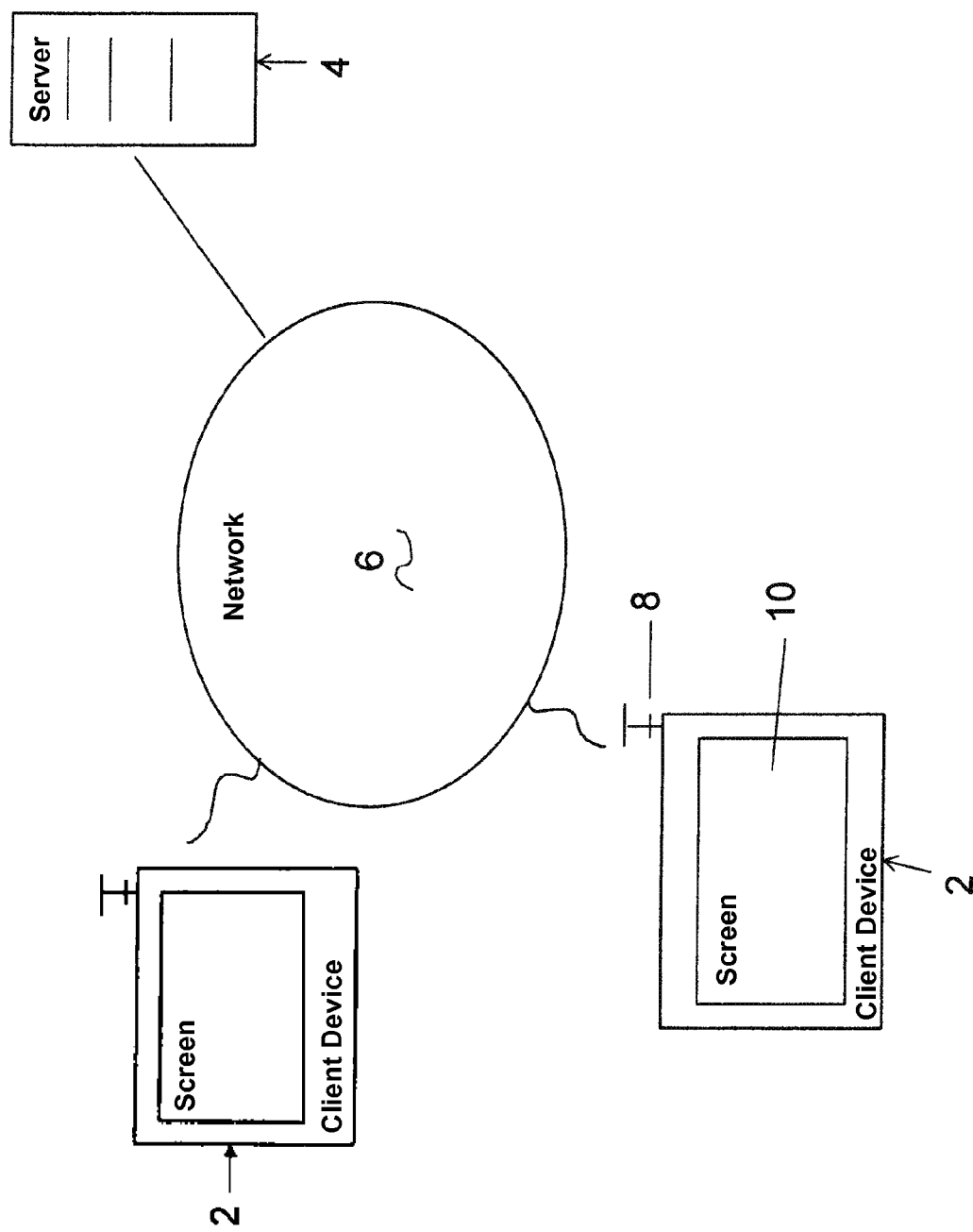
FIG. 1 is a schematic view of client and server devices in a network in an embodiment of the present invention.

FIG. 1 is a schematic view of a client device 2 and a server computer 4 in communication over a network 6 such as the internet. The client device 2 includes an aerial 8 for use in transmitting and receiving data over the network 6. The client device 2 also includes a screen 10 that can be used both for displaying an EPG to a user and for receiving user input. The client device 2 may be configured as a television or a personal computer on which a user can watch live television. Alternatively the client device 2 may be auxiliary to a television in a remote control, a personal computer, a tablet computer, a smart-phone or a personal digital assistant (PDA).

Figure 2:
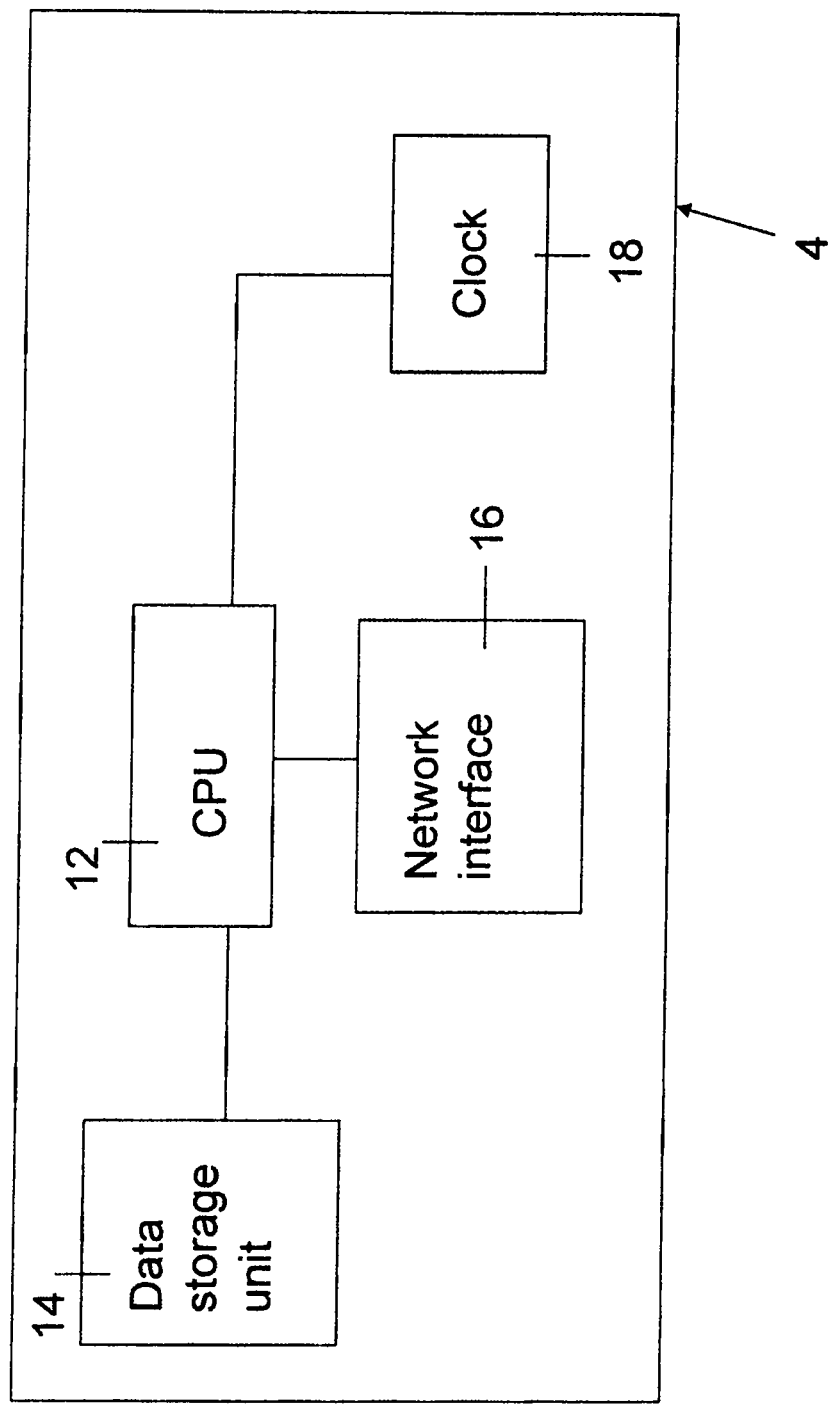
FIG. 2 is a schematic view of the components in a server device in an embodiment of the present invention.

Further detail of the server device 4 is provided in FIG. 2. The server device 4 includes a central processing unit (CPU) 12, a data storage unit 14, a network interface 16 and a clock 18. The server device 4 is arranged to output an EPG to the client devices 2 over the network 6 so that they can display the EPG showing current television programs.

Figure 3:
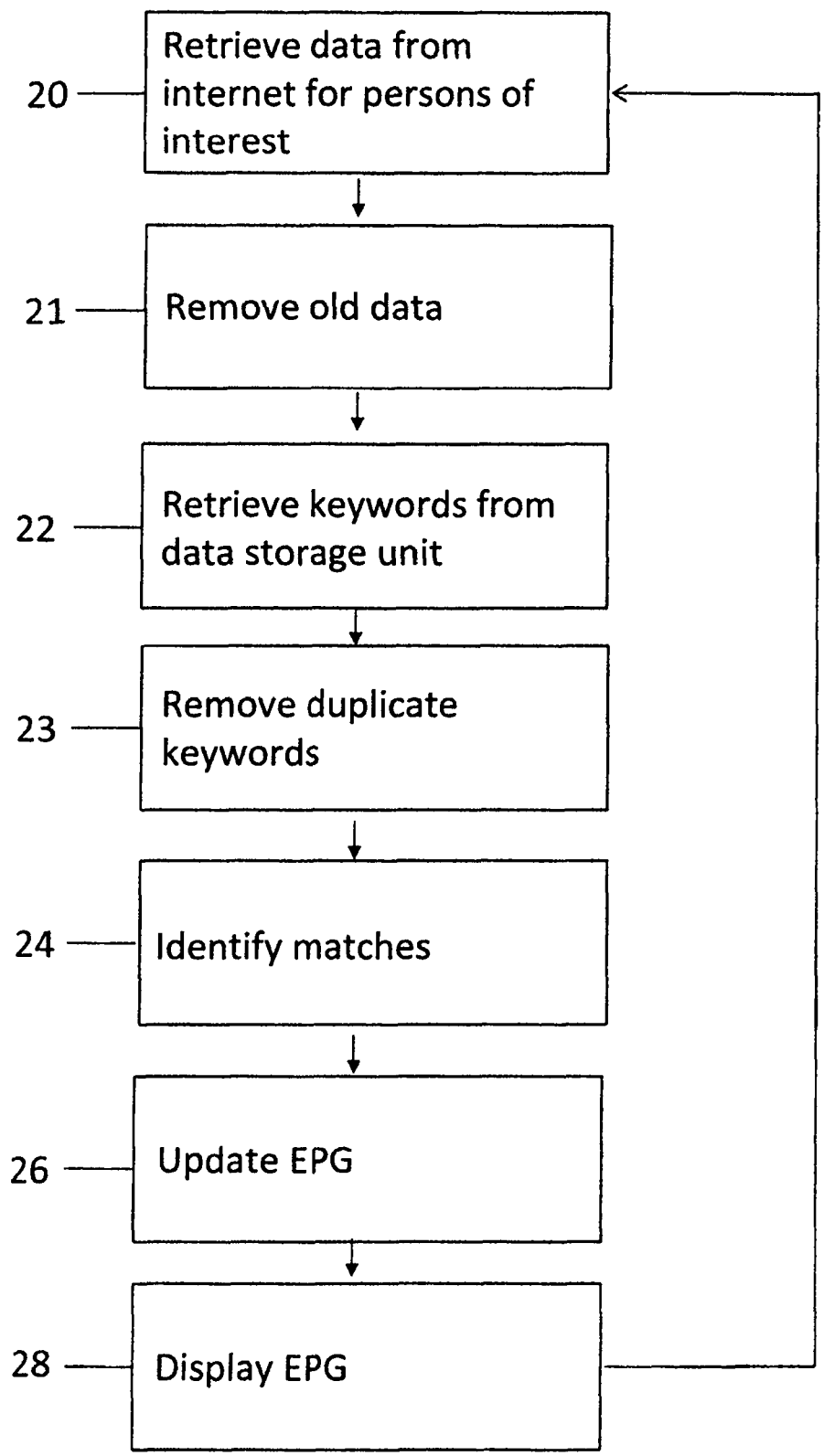
FIG. 3 is a flow diagram showing a sequence of steps that can be performed in a an embodiment of the present invention.

The operation of the invention will now be described with reference to the flow diagram shown in FIG. 3 and the screenshots shown in FIGS. 4A-C. At step 20 the server device 4 is configured to retrieve real-time data from a number of celebrities or other persons of interest. Specifically, the network interface 16 of the server 4 is configured to monitor Twitter® feeds for a number of individuals over the internet. As an alternative, or in addition, the network interface 16 may retrieve user generated updates from other social networking sites such as LinkedIn®, Bebo® and Facebook®. Typically the retrieved data includes text-based comments generated by the individuals.

At step 21 the CPU 12 checks the clock 18 and removes from consideration any retrieved data that was generated more than one hour ago. In this way it is possible to ensure that the CPU 12 only uses the most current data when identifying comments that match stored keywords. This may be important to ensure that the conclusions from the matching process are accurate. For example, it may avoid an inference that a person of interest is currently watching a particular program where that inference is based on a comment generated by the user more than an hour ago.

At step 22 the CPU 12 checks the clock 18 and retrieves a list of keywords from the data storage unit 14 that are relevant to the television shows that are currently being broadcast and for those television shows due to be broadcast within the next hour. The keywords that are retrieved will change with time, depending on the shows that are being broadcast. The keywords typically include the title of the relevant shows together with additional keywords that are related to actors, locations, themes and other relevant information.

At step 23 the CPU 12 is configured to remove any duplicates in the list of retrieved keywords. This will avoid the same keyword being used for two separate shows. In one example two separate shows could both use the keyword "Jamaica". An ambiguity would be created if this keyword was used by a person of interest. Therefore, the CPU 12 removes the duplicate keyword entirely.

At step 24 the CPU 12 identifies matches between words in the Twitter® feed retrieved at step 20, and keywords retrieved from the data storage unit 14 at step 22 (once any duplicates have been removed). By identifying matches the CPU 12 may be able to infer that a person of interest is likely to be watching a particular television show or commenting about it online.

At step 26 the CPU 12 is configured to modify the EPG that is output to client devices 2. Specifically, the CPU 12 is configured to insert a thumbnail image in the EPG for each match that is identified. The thumbnail image is typically associated with the relevant person of interest and it is inserted in the EPG alongside the relevant television show. In this way a user can appreciate that the person of interest is likely to be watching this show. At step 28 the network interface unit 16 is configured to output the modified EPG so that it can be displayed on the display 10 of the client devices 2.

Steps 20 to 28 are arranged to operate in a continuous loop. Thus, if a person of interest generates a new comment on their Twitter® account this will be detected at step 20. The new comment may generate new matches with keywords at step 24, and these new matches replace any matches that have been determined previously. Thus, the EPG can be updated at step 26 to include the most up-to-date information regarding a person of interest. In one example the CPU 12 may be able to determine if a person of interest has changed channel.

Figure 4A:
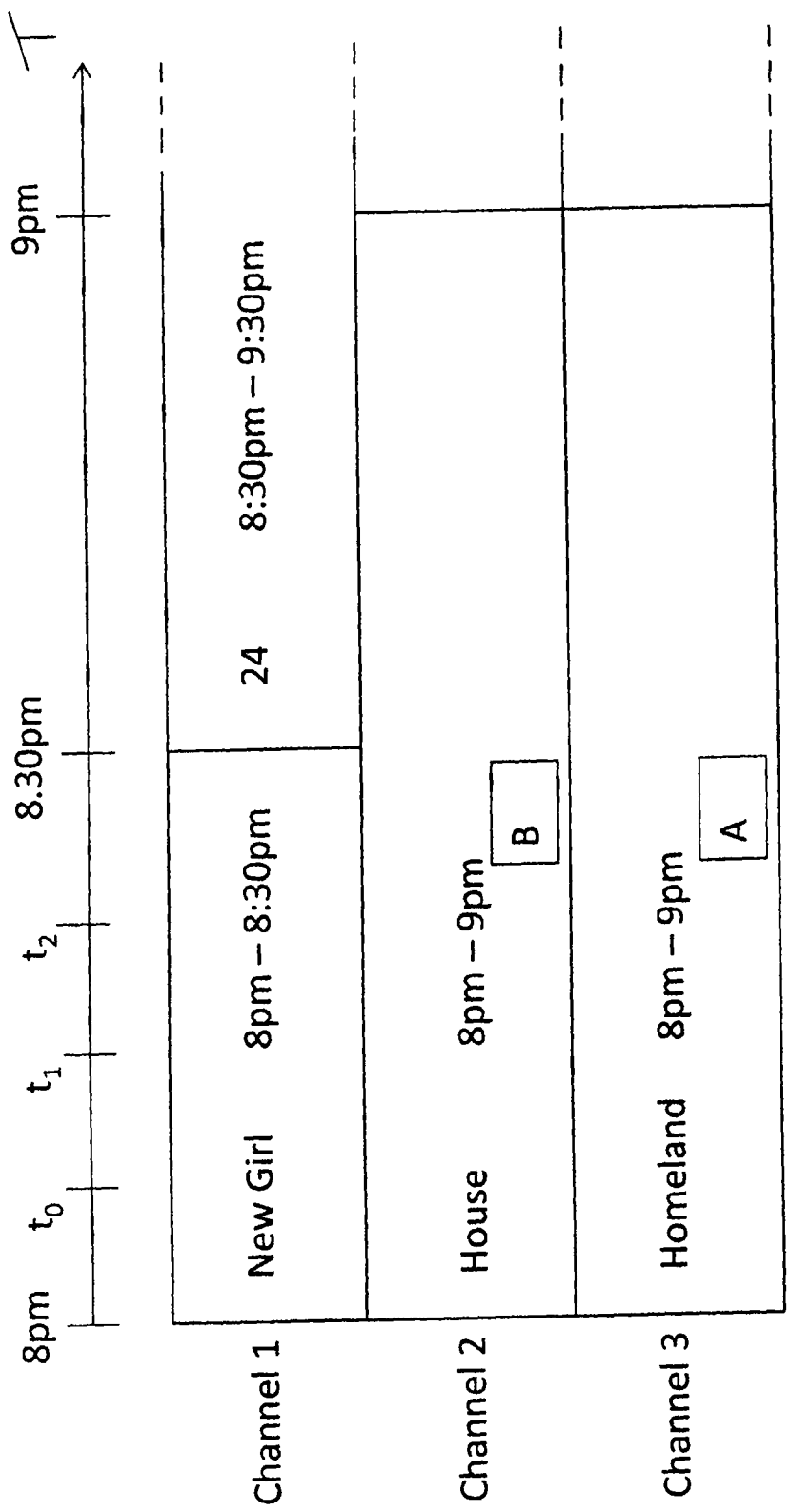
FIGS. 4A, 4B and 4C are screenshots showing an EPG in an embodiment of the invention.
Figure 4B:
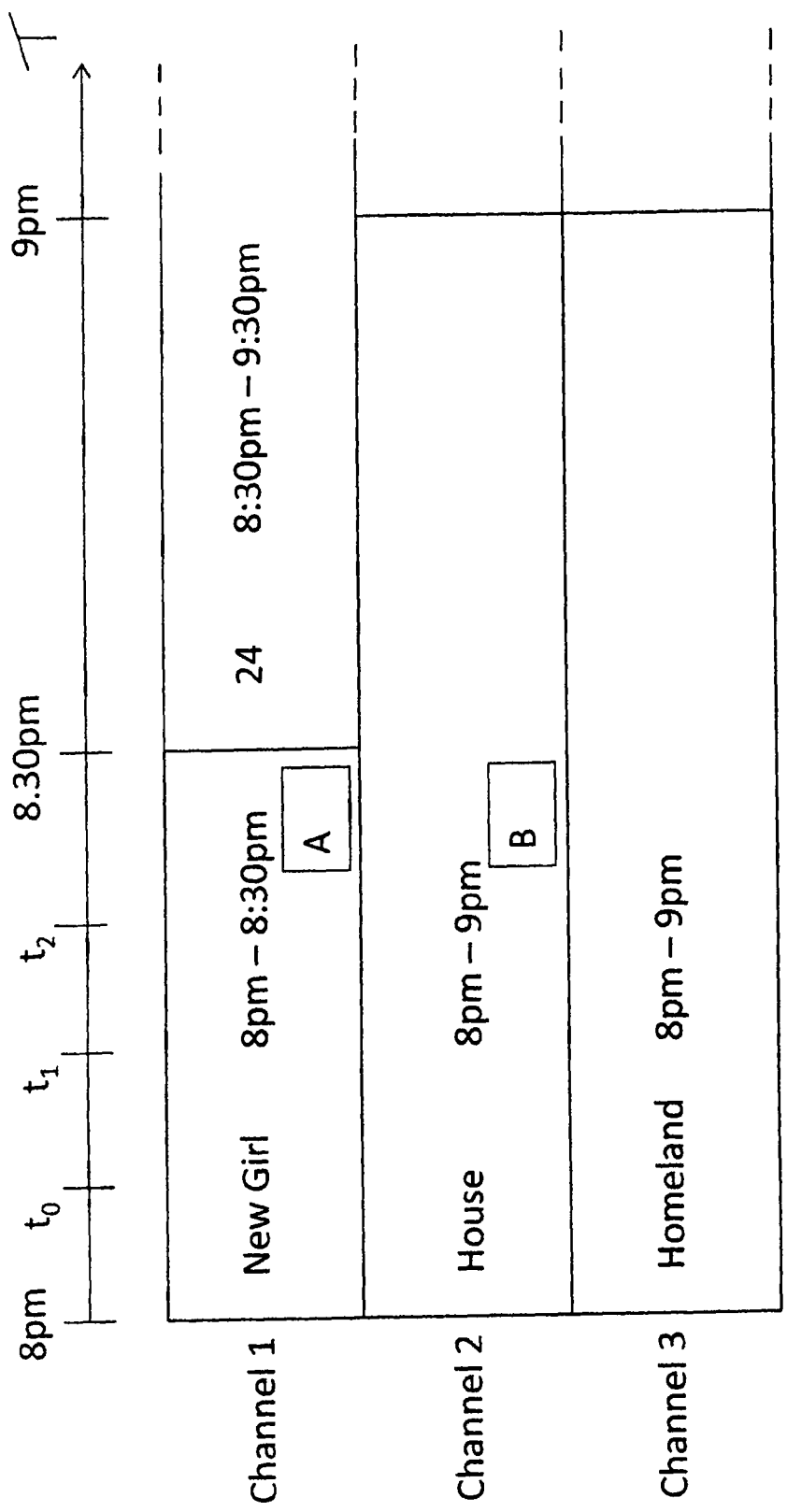
Figure 4C:
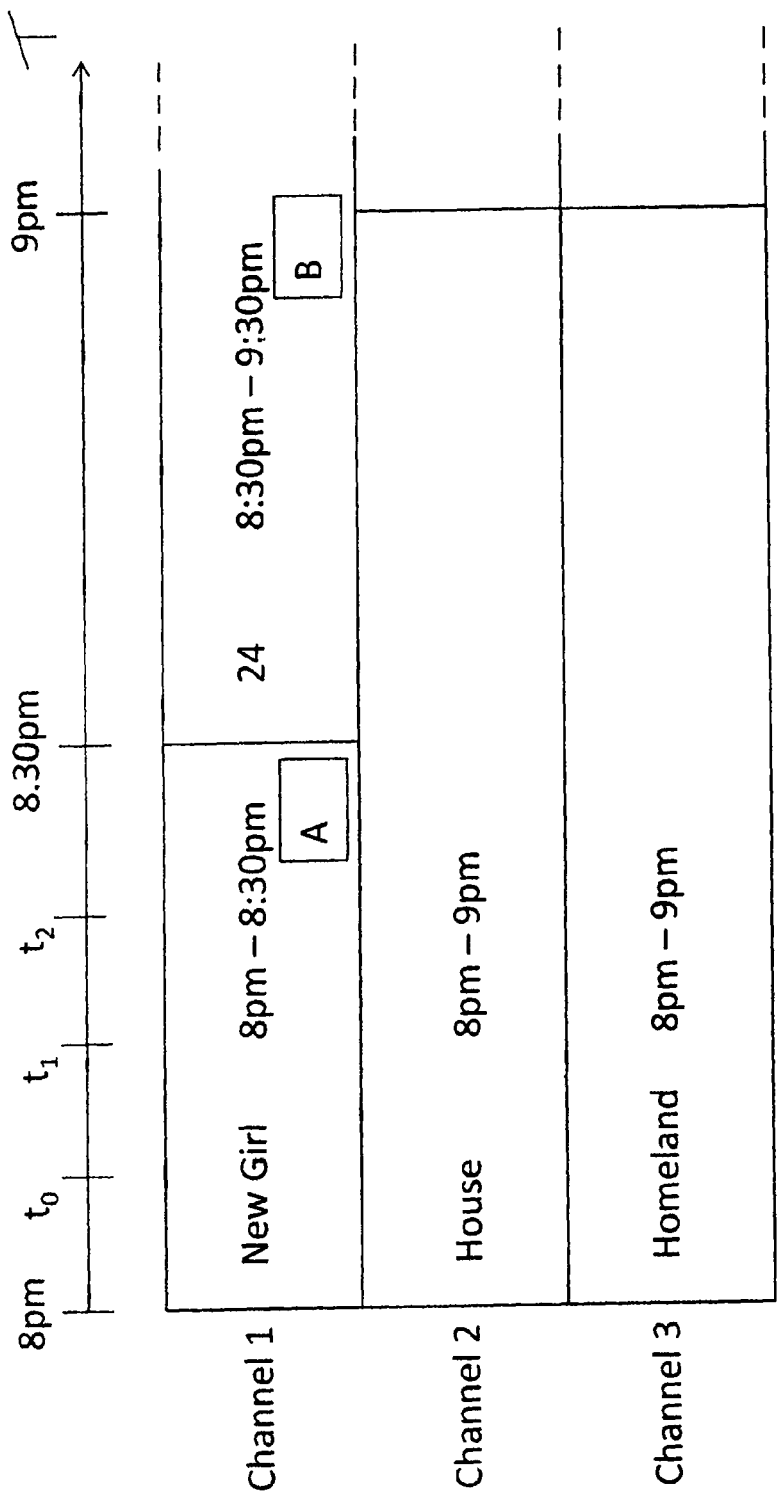

FIG. 4A shows a screenshot of an EPG in an example of the present invention. In this example television shows are displayed against a timeline for each of three channels. The shows being broadcast between 8 pm and 8:30 pm include "New Girl", "House" and "Homeland". Also in this example the show "24" is due to be broadcast between 8:30 pm and 9:30 pm. For each of these shows a number of keywords are stored in the data storage unit 14 as shown in Table 1 below.

TABLE 1

| Television Show | Keywords |
| --- | --- |
| "New Girl" | "New Girl"; "Zooey Deschanel"; "Deschanel"; "Schmidt"; "Winston" |
| "House" | "House"; "Hugh Laurie"; "Hugh"; "Princeton-Plainsboro" |
| "Homeland" | "Homeland"; "Brody"; "Danes"; "Damian Lewis" |
| "24" | "24"; "Twenty Four"; "CTU"; "Bauer" |

In this example the keywords include the names of the show, the names of actors, characters and places.

In this example the server 4 is configured to retrieve the keywords from the data storage unit 14 for all shows at the relevant time, and for those shows due to be broadcast within the next 60 minutes. The server 4 also acquires real-time data for a number of persons of interest, including persons "A" and "B". Table 2 shows comments generated on the internet by "A" and "B" at three sequential times between 8 pm and 8:30 pm.

TABLE 2

| Time | Twitter ® feed for A | Twitter ® feed for B |
| --- | --- | --- |
| $t_0$ | "What is happening in Homeland!?" | "Hugh Laurie is great" |
| $t_1$ | "Am now watching Zooey Deschanel - much more relaxing!" | |
| $t_2$ | | "Can't wait for the next episode of 24 later" |

At time $t_0$ the CPU 12 is configured to identify any words in the messages generated by A and B that match keywords retrieved from the data storage unit 14. In this example person A has a matching keyword at time $t_0$ for the show "Homeland" and person B has a matching keyword for the show "House". The CPU 12 is configured to modify the EPG so that thumbnail images for A and B are displayed adjacent the corresponding television show. FIG. 4A shows an example screenshot of a modified EPG at time $t_0$ in this example.

At time $t_1$ the CPU 12 again identifies any matches between the messages generated on the internet by A and B and keywords retrieved from the data storage unit 14. In this case the keywords at time $t_1$ are the same as the keywords at time $t_0$ because there has been no change in the television programs that are currently being broadcast. At time $t_1$ person A has a matching keyword for the show "New Girl" and person B continues to have a matching keyword for the show "House" based on the last message generated. The CPU 12 is configured to modify the EPG so that thumbnail images for A and B are displayed adjacent the relevant television show. FIG. 4B shows a screenshot of the modified EPG at time $t_1$. As can be seen, the thumbnail image for person A has moved adjacent the show "New Girl" because it is inferred that person A is now watching this show.

At time $t_2$ the CPU 12 again identifies any matches between the messages generated on the internet by A and B and keywords retrieved from the data storage unit 14. At time $t_2$ person B has a matching keyword for the show "24" and person A continues to have a matching keyword for the show "New Girl". The CPU 12 is configured to modify the EPG so that thumbnail images for A and B are displayed adjacent the relevant television show. In an alternative configuration two thumbnail images could be displayed for person B based on the show they are likely to be watching at time $t_2$ and the show they are likely to be watching in the future. Thus, a user can determine the viewing schedule of persons A and B, and can use this information in order to interact with these people and/or their peers. The users may also use this information when deciding which television shows to watch.

What is claimed is:

1. A computer system comprising:
a data storage unit arranged to store keywords related to television shows being broadcast; and
one or more processors configured to retrieve real-time comments generated by a plurality of persons of interest on the internet, filter the real-time comments in order to retain only those that are generated within a predefined time period, de-duplicate the stored keywords in order to remove entirely keywords that have duplicates, identify one or more matches between words in the retrieved comments and the de-duplicated stored keywords, and output an electronic program guide (EPG) including information relating to a plurality of television shows on different television channels and a plurality of thumbnail images of respective persons of interest, wherein the thumbnail images are embedded in the EPG at positions that correspond with the television show and channel for which a match has been determined, between the filtered real-time comments and the stored keywords so that the embedded thumbnail images in the EPG infer that the respective persons of interest are watching the television shows identified in the match, or are discussing them, based on their real-time comments on the internet.

2. The computer system of claim 1 wherein the output EPG includes content related to the most recent match identified by the one or more processors.

3. The computer system of claim 1 wherein the one or more processors are configured to rank television shows in the EPG according to the number of persons of interest with matching real-time data.

4. The computer system of claim 1 wherein the data storage unit is arranged to store data related to television shows scheduled to be broadcast at future times, and the one or more processors are configured to identify one or more matches between the retrieved comments and the stored keywords related to television shows scheduled to be broadcast at future times.

5. The computer system of claim 1 further comprising a display for showing the EPG and the content related to a match identified by the one or more processors.

6. The computer system of claim 1 further comprising:
a first user device comprising a display; and
a server computer configured to communicate with the first user device.

7. A method of outputting an EPG comprising the steps of:
retrieving real-time comments generated by a plurality of persons of interest on the internet;
filtering the real-time comments to retain only those that are generated within a predetermined time period;
de-duplicating stored keywords that are related to television shows being broadcast in order to remove entirely keywords that have duplicates;
identifying one or more matches between words in the retrieved comments and the de-duplicated stored keywords; and
outputting an EPG including information relating to a plurality of television shows on different television channels and a plurality of thumbnail images of respective persons of interest, wherein the thumbnail images are embedded in the EPG at positions that correspond with the television show and channel for which a match has been determined, between the filtered real-time comments and the stored keywords so that the embedded thumbnail images in the EPG infer that the respective persons of interest are watching the television shows identified in the match, or are discussing them, based on their real-time comments on the internet.

8. A non-transitory computer readable storage medium having a computer program stored thereon, the computer program comprising processor readable instructions that, when executed, direct a device to perform actions comprising:

retrieving real-time comments generated by a plurality of persons of interest on the internet;
filtering the real-time comments to retain only those that are generated within a predetermined time period;
de-duplicating stored keywords that are related to television shows being broadcast in order to remove entirely keywords that have duplicates;
identifying one or more matches between words in the retrieved comments and the de-duplicated stored keywords; and
outputting an EPG including information relating to a plurality of television shows on different television channels and a plurality of thumbnail images of respective persons of interest, wherein the thumbnail images are embedded in the EPG at positions that correspond with the television show and channel for which a match has been determined, between the filtered real-time comments and the stored keywords so that the embedded thumbnail images in the EPG infer that the respective persons of interest are watching the television shows identified in the match, or are discussing them, based on their real-time comments on the internet.

* * * * *